June 30, 1953 E. G. B. RILEY 2,643,982
LIGHT ABSORBENT COATING AND COATED ARTICLE
Filed May 6, 1949
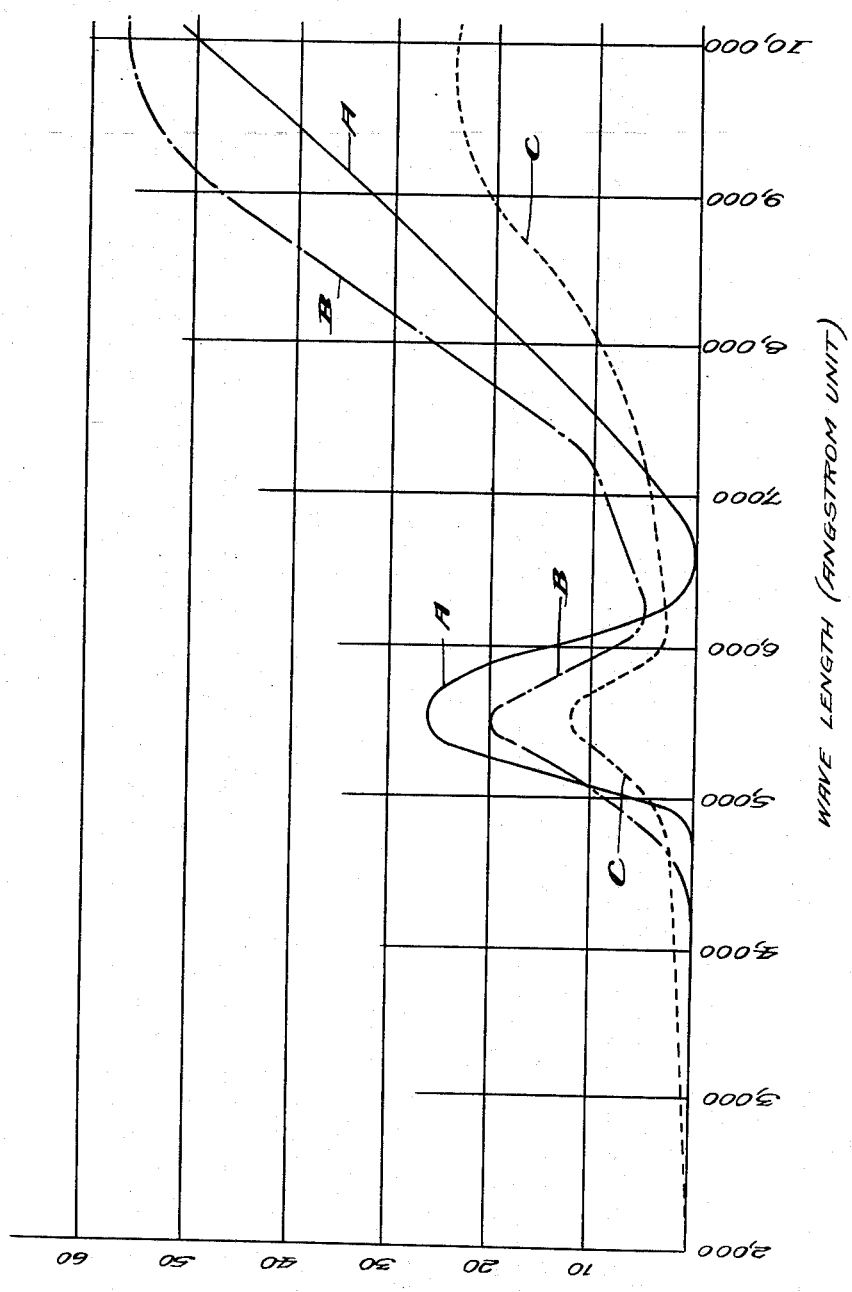
INVENTOR
ELWYN G.B. RILEY,
*his* ATTORNEYS Patented June 30, 1953

2,643,982

UNITED STATES PATENT OFFICE 2,643,982

LIGHT ABSORBENT COATING AND COATED ARTICLE

Elwyn G. B. Riley, Pinehurst, N. C.

Application May 6, 1949, Serial No. 91,758

9 Claims. (Cl. 260—32.8)

This invention relates to plastic coating compositions and coated articles, and more particularly to light absorbent plastic coating compositions and articles coated therewith designed to transmit selected beneficial wave lengths of light and to exclude other wave lengths of light detrimental to certain commodities.

It is well known that energy radiated in the form of light rays is capable of inducing and/or promoting certain photochemical reactions and that different photochemical reactions are induced by the action of light rays of various wave lengths. In the case of foodstuffs, beverages and the like, such reactions frequently result in offensive tastes and odors and often in deterioration or spoilage which render them unsatisfactory for use. It is also well known that certain wave lengths of light, such as those in the ultraviolet range, even in the amount present in normal sunlight, are injurious to the eyes.

Heretofore, it has been proposed to provide a light absorbing wrapper or container for commodities deleteriously affected by light by means of which wave lengths of light below 4500 Angstrom units and preferably below 4900 Angstrom units are excluded from the commodities. In some cases it is also desirable to exclude substantial portions of those wave lengths of light between 6300 and 6700 Angstrom units or between 6300 and 7500 Angstrom units depending upon the nature of the commodities to be shielded. The latter has been found to be most effective with commodities that are highly photosensitive, particularly milk, malt beverages, and commodities containing substantial amounts of vegetable oils and fats as well as proteins.

In general, such prior wrappers and containers have been subject to one or more disadvantages. Thus, in some cases the packaging materials used are rapidly deteriorated by sunlight and hence do not hold up well in use. In other cases the packaging materials are only partially successful in screening out or absorbing the undesired wave lengths of light. In other cases appearance and/or costs of manufacture render the materials commercially unfeasible for packaging and like uses.

A primary object of this invention, therefore, is the provision of an improved plastic coating composition which may be applied as a protective and/or decorative coating to textiles, bottles, glass, paper and like articles and materials normally transparent or translucent to some or all of the wave lengths of visible and ultraviolet light as well as all or a portion of the infrared or invisible light, and which will screen out or absorb certain deleterious and harmful wave lengths of light while transmitting selected wave lengths of light which have a beneficial effect.

A further object of the invention is the provision of a flexible plastic coating composition which may be economically manufactured and applied and which will overcome the disadvantages of prior materials and methods used for this purpose.

A still further object of the invention is the provision of an improved flexible plastic coating composition which is tough and durable and highly resistant to deterioration by sunlight and by the substance or material which is sought to be protected.

Another object of the invention is the provision of an improved vinyl resin plastic coating composition which may be applied as a coating or impregnant to various types of materials and/or objects normally permeable to light rays of some or all wave lengths from 2000 to 7500 Angstrom units, so that the coated or impregnated material or object will screen out or absorb wave lengths of light in the ultraviolet, violet and blue regions below about 4900 Angstrom units and will transmit selected beneficial wave lengths of light above about 4900 Angstrom units.

Another object of the invention is the provision of a vinyl resin plastic coated material or article which will screen out or absorb substantially all wave lengths of ultraviolet, violet and blue light below about 4500 Angstrom units and preferably below 4900 Angstrom units and portions of light waves above about 6300 Angstrom units, and will transmit selected wave lengths of light between about 4900 and about 6300 Angstrom units.

A further object of the invention is the provision of a flexible plastic coating having a long fatigue life which will withstand, without undue deterioration, repeated launderings and sterilization temperatures and which will be substantially resistant to destructive action of soaps, soda and acids.

The above and other aims and advantages of the invention will be apparent to persons skilled in the art to which the invention relates from a consideration of the following more detailed description and the accompanying drawings showing spectrophotometric graphs of suitable coated materials according to the invention.

In the drawings, there are illustrated spectrophotometric curves of three coated materials according to the invention.

Curve A illustrates the relative transmission, in percentage, of wave lengths of light of a transparent sheet coated according to the invention. Such a coated sheet absorbs all wave lengths of light below 4500 Angstrom units, preferably in the low ultraviolet down to 2000 Angstrom units. In some instances a small amount of transmission at 4900 Angstrom units is not objectionable but the coating of the present invention is suitable for absorption from 2000 to 4900 Angstrom units. A requirement of the coating is that it absorb all wave lengths of light from 2000 to at least 4500 Angstrom units and preferably up to 4900 Angstrom units.

Transmission of wave lengths of light between 4500 or 4900 Angstrom units and 6000 Angstrom units is required and preferably to 6300 Angstrom units, and such transmission desirably should be at least 10 percent and preferably in the order of 25 percent so as to irradiate the commodities enclosed within the material with beneficial wave lengths of light.

This coated material absorbs substantial amounts of wave lengths of light above 6300 Angstrom units and preferably this absorption is such that not more than 15 percent transmission is effected between 6300 and 7500 Angstrom units. Desirably the coated material does not transmit more than 60 percent of the near infrared wave lengths of light up to 10,000 Angstrom units.

Curve A illustrates a desired light transmission of a coated material in which there is a peak transmission between 5400 and 5600 Angstrom units in the visible spectrum and not more than 60 percent transmission in the near infrared (7500 to 10,000) accompanied by substantially complete absorption of wave lengths of light from 2000 to 4900 and from 6300 to 7000 Angstrom units.

Curve B illustrates a very satisfactory spectrophotometric curve of a container suitable for packaging malt beverages, applied to clear fluid glass, in which there is a peak transmission at 5400 to 5600 Angstrom units of approximately twenty percent and not more than approximately 10 percent transmission of the wave lengths of light between 6000 and 7250, accompanied by substantially complete absorption of the wave lengths from 2000 up to 4500 Angstrom units.

Curve C illustrates a spectrophotometric curve of cotton textile material, coated according to the invention, in which the transmission between 5400 and 5600 Angstrom units is at least 10 percent with less than approximately five percent transmission between 6000 and 7500 Angstrom units.

In no case should transmission at 4500 Angstrom units be greater than approximately 2 percent, which is considered substantial absorption. In all cases the coating and coated articles are of a green color.

In accordance with the present invention various porous and non-porous materials of a translucent or transparent character transmitting all or a substantial portion of the wave lengths of light of the solar spectrum, i. e. from 2000 to 10,000 Angstrom units, are coated with a plastic coating composition designed to impart to the material the properties of substantially screening out or absorbing certain detrimental wave lengths of light, particularly below 4500 Angstrom units, and preferably below 4900 Angstrom units, and of transmitting selected beneficial wave lengths of light above 4900 Angstrom units, and particularly between 4900 and 6300 Angstrom units. Porous materials such as textiles including cotton, rayon and the like and non-porous materials such as glass, plastic and the like are particularly adapted for treatment in accordance with this invention.

Referring to the drawings, the nature of the plastic coating is such as to impart to the coated material the properties of excluding by absorption the wave lengths of ultraviolet, violet and blue light below 4500 Angstrom units and preferably below 4900 Angstrom units. Desirably the coated material will also exclude to a substantial extent the wave lengths of light between about 6300 and 7500 Angstrom units and preferably between about 6300 and 6700 and above about 6700 Angstrom units, depending upon the commodities to be protected by the coated article.

The plastic coating composition in accordance with the present invention, comprises, in general, a dispersion of pigments only, such as iron oxide yellow (ferrite yellow), carbon black, and copper phthalocyanine green, in a plastic vehicle dissolved in a suitable solvent. Preferably the plastic coating composiiton of this invention will comprise a dispersion of pigments only in an air drying vinyl resin vehicle, with or without the addition of methyl methacrylate resin to impart additional toughness, dissolved in a suitable solvent-diluent mixture preferably of ketones, esters and hydrocarbons. The composition may be applied in any of a number of known manners, such as by spraying, immersing, knife-coating, padding and the like, the specific composition being adjusted to fit the particular material to be coated and the mode of application.

The following examples are illustrative of specific embodiments of the invention but are not to be construed as limitative of the broad conceptions herein disclosed.

*Example I*

The following is a typical formula of a coating composition in accordance with this invention which is particularly suitable for coating non-porous surfaces such as bottles and the like. By varying the amount of diluent added at the end, the viscosity of the coating can be altered in such a way that it can be used either for dipping or spraying purposes.

20 lbs., 11 ozs. vinyl resin VMCH
2 lbs., 15 ozs. methyl methacrylate resin
13 lbs., 11 ozs. acetone
10 lbs., 3 ozs. cyclohexanone
12 lbs., 11 ozs. toluene
14 lbs., 13 ozs. ethyl acetate
15 lbs. plasticizer (dioctyl phthalate)
3 lbs., 12 ozs. ferrite yellow vinyl paste
6 lbs. copper phthalocyanine green vinyl paste
12 ozs. carbon black vinyl paste
200 lbs. toluene The above composition was prepared by dissolving the vinyl resin VMCH and methyl methacrylate resin in the mixture of solvents and diluent by stirring at room temperature. Instead of stirring at room temperature substantially similar results may be obtained by heating to a temperature not in excess of 50° C. under a reflux to avoid loss of solvents and diluents. After the resins were completely dissolved, the plasticizer, pigment vinyl paste and the additional toluene were added and stirred until the mixture was completely uniform or homogeneous in color. The color pigments were previously dispersed in vinyl resin by grinding on a heated two-roll mill to the softening temperature of the resin.

When coated on a bottle, the above composition provided a non-tacky plastic coating of good appearance which had excellent light fastness properties (300 to 400 hours in the fadeometer), excellent resistance to sterilization temperature up to about 200° F., and which transmitted substantial portions of selected beneficial wave lengths of light between about 4900 and 6300 Angstrom units and above about 6700 Angstrom units, and which excluded detrimental wave lengths of light below about 4500 Angstrom units, and substantial portions of the wave lengths of light between about 6300 and 6700 Angstrom units. Such coated bottle is highly desirable for the protective packaging of beverages and liquids such as milk, malt beverages, citrus and vegetable juices containing vitamins, proteins and the like.

Example II

The following formulation is particularly suitable for treating porous materials such as textiles, for example in padding cotton fabric by immersing the fabric sheet material in the lacquer and then squeezing out the excess by passing between rollers.

20 lbs., 11 ozs. vinyl resin VMCH
2 lbs., 15 ozs. methyl methacrylate resin
13 lbs., 11 ozs. acetone
10 lbs., 3 ozs. cyclohexanone
12 lbs., 11 ozs. toluene
15 lbs., 13 ozs. ethyl acetate
48 lbs. plasticizer (bioctyl phthalate)
11 lbs., 4 ozs. ferrite yellow vinyl paste
9 lbs. copper phthalocyanine green vinyl paste
2 lbs., 4 ozs. carbon black vinyl paste
100 lbs. toluene The ingredients were compounded as in Example I to produce a fluid coating. The cotton textile fabric was immersed in the coating and the excess was squeezed out as above recited, and the material then air-dried. The material may also be dried at an elevated temperature not to exceed 140° F. if so desired in order to carry out the drying process at a faster rate for the removal of solvent and diluent only. The resulting material remained soft and flexible and had the characteristic properties of transmitting certain beneficial rays of light between about 4500 and 6000 Angstrom units and above about 7500 Angstrom units and of excluding certain detrimental wave lengths of light below about 4500 Angstrom units and between about 6300 and 7500 Angstrom units, as shown in curve C, excellent light fastness properties (300–400 hours in the fadeometer), and excellent resistance to laundering temperatures, soap, soda, and acids.

Example III

The following formulation is particularly useful in the knife-coating of textiles, such as cotton, by applying a very viscous coating composition to one side of the cotton by spreading the composition over the material to any thickness desired by means of a knife edge.

20 lbs., 11 ozs. vinyl resin VMCH
2 lbs., 15 ozs. methyl methacrylate resin
13 lbs., 11 ozs. acetone
10 lbs., 3 ozs. cyclohexanone
12 lbs., 11 ozs. toluene
14 lbs., 13 ozs. ethyl acetate
37 lbs., 8 ozs. plasticizer
3 lbs., 12 ozs. ferrite yellow vinyl paste
3 lbs. copper phthalocyanine green vinyl paste
12 ozs. carbon black vinyl paste This composition was prepared as in Example I and then applied to cotton as above indicated to produce a coated material having the desired light transmission and other characteristics of the material described in Example II.

Example IV

The following formulation may be used for padding acetate rayon in the same manner as the cotton of Example II.

36 lbs. vinyl resin VMCH
114 lbs. mesityl oxide
50 lbs. toluene
10 lbs. ferrite yellow vinyl paste
8 lbs. copper phthalocyanine green vinyl paste
2 lbs. carbon black vinyl paste
40 lbs. plasticizer (dioctyl phthalate)
100 lbs. toluene The resulting coated material had the characteristic properties of the coated materials of Examples II and III.

The plastic component of the coating composition in accordance with the present invention may be selected from any of the well known plastic materials having the desired resistance to sunlight, weak acids and alkalies, and elevated temperatures. Examples of such materials are the vinyl resins, cellulose acetate, cellulose nitrate, ethyl cellulose, chlorinated rubber and the like. The vinyl resins and especially the air-drying vinyl resins are particularly advantageous for the purposes of the present invention and are preferably used either alone or in combination with added quantities of another resin, such as methyl methacrylate resin, to impart additional toughness to the coating. Of the various vinyl resins available I prefer to use the vinyl acetate chloride copolymer air-drying type (vinyl resin VMCH). Vinyl resin VYHH, which is a partial air-drying and baking type, is also satisfactory although the resulting properties are not quite as good. The term "air-drying resin," as used herein, is intended to include those which are partially air-drying. Regular baking type resins are generally not particularly suitable for the purposes of the present invention and hence will rarely be used.

The solvent-diluent mixture employed will largely depend on the particular material being treated and the particular resin or plastic material used. In the case of the vinyl resins where the composition is to be applied to cotton textiles, glass and the like, it is preferred to use a mixture of ketones, esters and hydrocarbons, where the ketones and esters may be termed solvent and hydrocarbons the diluent.

The ketones, as a class, are the most satisfactory solvents for use in vinyl resin surface coatings of the type herein described since they dissolve larger concentrations of resin without gelling, yield lower solution viscosities at equivalent total solids contents, and tolerate greater dilution with nonsolvent diluents. Esters do not dissolve as much resin or yield solutions of such low viscosities as the corresponding ketones but are preferably included because of various advantages obtained by their use. A hydrocarbon diluent is employed to produce desired changes in the viscosity phases without changing the solid content. Sufficient diluent is employed to produce the desired viscosity characteristics. However, the amount of diluent employed should not be high enough so that the resin will no longer be soluble in the diluent.

The ketones utilized may be saturated or unsaturated, the former being preferred for economic reasons since they are lower in cost. Where the composition is to be applied to rayon and like synthetic materials, the mixture of solvents and diluent preferably comprises unsaturated ketones and hydrocarbons, since saturated ketones have a dissolving action on acetate rayon. Any of the saturated ketones such as acetone, diethyl ketone, methyl ethyl ketone, and the like, or unsaturated ketones such as mesityl oxide, isophorone and the like, are suitable for the purpose. Cyclopentanone, cyclohexanone and similar ketones are likewise suitable. The ester ingredient of the solvent mixture preferably comprises ethyl acetate although other alkyl esters having the desired solvent properties may be used. Examples of such esters are methyl acetate, n-butyl acetate, isopropyl acetate, carbol acetate and the like. Toluene is the preferred hydrocarbon diluent although other hydrocarbon diluents such as benzene, xylene, monochlortoluene, mineral spirits such as "Solvesso #1," petroleum naphtha such as "toluol," "Tetralin" (tetrahydronaphthalene) and the like may be used.

Where plastic materials other than the vinyl resins are used suitable solvents or solvent-diluents mixtures may be selected in accordance with commercial usage and the requirements of the particular application.

A plasticizer or mixture of plasticizers is desirably included in all formulations to lend flexibility thereto. Most satisfactory results have been obtained with dioctyl phthalate and this material is preferred. However, other plasticizers having similar plasticizing properties with respect to the particular resin or plastic material being used are likewise satisfactory. Examples of suitable plasticizers of this type are tricresyl phosphate, butoxyglycol phthalate, chlorinated paraffin, ethylhexyl phthalate, methoxyglycol acetylricin oleate and the like.

The particular light absorbents required for the purposes of the present invention are exclusively pigments and preferably comprise a mixture of copper phthalocyanine pigments with inorganic pigments. A mixture of ferrite yellow, copper phthalocyanine green and carbon black give highly satisfactory results. Copper phthalocyanine blue may be substituted for the copper phthalocyanine green with increase of the ferrite yellow but the curve is not as satisfactory. Carbon black or equivalent pigment is necessary to give the desired spectral properties, the desired light fastness and to reduce the very bright green formed by the mixing of copper phthalocyanine green and ferrite yellow to a duller green shade. The pigments are preferably dispersed in vinyl resin by grinding on a heated two-roll mill to the softening temperature of the resin and then adding to the other ingredients in the form of a vinyl resin paste.

The relative proportions of ingredients in the plastic coating compositions according to the present invention will depend on a number of factors such as the character of the body or base material to be treated, the character of the particular resinous plastic material used, the thickness of the coating, the number of coatings utilized or desired, and the manner of applying the coating. In all cases the resinous plastic material will be included in sufficient amounts to form a continuous, coherent and strong film or coating. The amount of solvent-diluent mixture used will, of course, vary with the manner of applying the coating. Thus, for dipping or spraying bottles considerably more solvent-diluent mixture will ordinarily be required than for padding textiles such as cotton and rayon. The latter type of treatment in turn requires more solvent-diluent mixture than a knife-applied coating. Plasticizers will be included in the amounts required to give the desired plasticity to the coating in accordance with well known practice.

The pigment components of the mixture will be suitably proportioned to give the desired light transmission characteristics to the coated material or article. For dipping or spraying glass bottles and the like the copper phthalocyanine green pigment may be used with somewhat smaller quantities of ferrite yellow pigment and even smaller quantities of carbon black pigment. For padding cotton textiles somewhat more of the ferrite yellow pigment may be used. In general, the ratio of copper phthalocyanine green to ferrite yellow will vary from about 2:1 to about 2:3 although certain applications may require the use of ratios outside of this range. Generally the carbon black pigment will constitute from about 5 to about 15% of the pigment mixture.

Hence, although the examples given hereinabove represent preferred plastic coating compositions in accordance with the present invention, considerable variation therefrom in specific ingredients and amounts of ingredients used is possible without departing from the scope of the invention. Likewise, although a preferred method of compounding the ingredients is given for purposes of exemplification, other methods well known to the art may be used within the purview of the invention. In this connection an important feature of this invention is that after application on textiles, bottles and the like, the coatings are air-dried. Thus, there is no need to cure the coating by heating or drying at an elevated temperature unless desired in order to carry out the drying process at a faster rate for removal of the solvents and diluent only.

The improved plastic coating compositions of the invention may be applied to various porous and non-porous materials such as textiles, including cotton, rayon and the like, glass, plastic sheets and articles made of these materials. Such coatings have excellent light fastness properties (300 to 400 hours in the fadeometer), excellent resistance to sterilization temperatures up to about 200° F. and excellent resistance to laundering temperatures as well as to soap, soda and acids.

I claim:

1. A light absorbent liquid coating composition comprising a dispersion of black and ferrite yellow inorganic pigments and a copper phthalocyanine green pigment in a plastic vehicle comprising an air-drying vinyl resin dissolved in a ketone, the black pigment constituting from about 5 percent to about 15 percent of the total pigment, the remainder comprising essentially the copper phthalocyanine and yellow pigments, and the ratio of copper phthalocyanine pigment to yellow pigment varying from about 2 to 1 to about 2 to 3, the pigments being so proportioned in said composition that a film formed therefrom has the properties of absorbing substantially all wave lengths of ultra violet, violet and blue light below approximately 4500 Angstrom units and substantial amounts of wave lengths of light from 6300 to approximately 7500 Angstrom units and of transmitting substantial amounts of wave lengths of light in all other regions.

2. A light absorbent liquid coating composition as set forth in claim 1 in which the plastic vehicle includes methyl methacrylate resin to impart additional toughness to the coating.

3. A light absorbent liquid coating composition as set forth in claim 1 in which the plastic vehicle includes a hydrocarbon diluent.

4. A light absorbent liquid coating composition as set forth in claim 1 in which the plastic vehicle includes an alkyl ester.

5. A light absorbent liquid coating composition as set forth in claim 1 in which the plastic vehicle includes an alkyl ester and a hydrocarbon diluent.

6. A light absorbent liquid coating composition as set forth in claim 1 in which the plastic vehicle includes a plasticizer for the resin.

7. A light absorbent liquid coating composition as set forth in claim 1 in which the air-drying vinyl resin comprises a vinyl acetate chloride copolymer resin.

8. A coated article suitable for the transmission of selected wave lengths of light comprising a normally translucent non-porous body and a light-stable unitary coating thereon formed from a coating composition comprising a dispersion of black and ferrite yellow inorganic pigments and a copper phthalocyanine green pigment in a plastic vehicle comprising an air-drying vinyl resin dissolved in a ketone, the black pigment constituting from about 5 percent to about 15 percent of the total pigment, the remainder comprising essentially the copper phthalocyanine and yellow pigments and the ratio of copper phthalocyanine pigment to yellow pigment varying from about 2 to 1 to about 2 to 3, the pigments being so proportioned in said composition that said coating formed therefrom has the properties of absorbing substantially all wave lengths of ultra violet, violet and blue light below approximately 4500 Angstrom units and substantial amounts of wave lengths of light from 6300 to approximately 7500 Angstrom units and of transmitting substantial amounts of wave lengths of light in all other regions.

9. A coated article suitable for the transmission of selected wave lengths of light comprising a normally translucent textile material and a light-stable unitary coating thereon formed from a coating composition comprising a dispersion of black and ferrite yellow inorganic pigments and a copper phthalocyanine green pigment in a plastic vehicle comprising an air-drying vinyl resin dissolved in a ketone, the black pigment constituting from about 5 percent to about 15 percent of the total pigment, the remainder comprising essentially the copper phthalocyanine and yellow pigments and the ratio of copper phthalocyanine pigment to yellow pigment varying from about 2 to 1 to about 2 to 3, the pigments being so proportioned in said composition that said coating formed therefrom has the properties of absorbing substantially all wave lengths of ultra violet, violet and blue light below approximately 4500 Angstrom units and substantial amounts of wave lengths of light from 6300 to approximately 7500 Angstrom units and of transmitting substantial amounts of wave lengths of light in all other regions.

ELWYN G. B. RILEY.

References Cited in the file of this patent

UNITED STATES PATENTS

| Number | Name | Date |
| --- | --- | --- |
| 2,302,305 | Farrell | Nov. 17, 1942 |
| 2,439,395 | Leatherman | Apr. 13, 1948 |